United States Patent

Peeters et al.

[11] Patent Number: 5,139,148
[45] Date of Patent: Aug. 18, 1992

[54] DAYLIGHT-LOADING FILM SHEET PACKAGE

[75] Inventors: Dirk Peeters, Kontich; Herman L. Cornelissen, Aartselaar; Jozef L. Van Engeland, St. Katelijne-Waver; Geert J. Clauwaert, Melle; Luc E. Onghena, Schilde, all of Belgium; Manfred Schmidt, Kircherheim, Fed. Rep. of Germany; Ernst Widemann, Dachau, Fed. Rep. of Germany; Johann Zanner, Unterhaching, Fed. Rep. of Germany; Eric P. De Clercq, Edegem; Wilfried E. Muylle, Schoten, both of Belgium

[73] Assignee: Agfa-Gevaert N.V., Mortsel, Belgium

[21] Appl. No.: 559,090

[22] Filed: Jul. 30, 1990

[30] Foreign Application Priority Data

Aug. 22, 1989 [EP] European Pat. Off. ......... 89202123.9

[51] Int. Cl.$^5$ .......................................... G03B 42/04
[52] U.S. Cl. ...................................... 206/455; 378/184
[58] Field of Search ................ 206/455; 378/182, 183, 378/184; 354/276, 277

[56] References Cited

U.S. PATENT DOCUMENTS

| | | | |
|---|---|---|---|
| 1,952,096 | 3/1934 | Saffir | 378/182 X |
| 3,168,647 | 2/1965 | Kollock | 378/184 |
| 3,443,093 | 5/1969 | Lindenmuth et al. | 206/455 X |
| 3,979,051 | 9/1976 | Close | 206/455 X |
| 4,093,069 | 6/1978 | Smolderen | 206/455 |
| 4,244,645 | 1/1981 | Vackier et al. | 354/276 X |
| 4,295,565 | 10/1981 | Takeuchi | 206/455 |
| 4,388,992 | 6/1983 | Deconinck | 206/455 |
| 4,438,164 | 3/1984 | Pfeifer et al. | 206/455 X |
| 4,537,307 | 8/1985 | Tamura | 206/455 |
| 4,721,209 | 1/1988 | Guazzotti | 206/455 |
| 4,727,391 | 2/1988 | Tajima et al. | 206/455 X |
| 4,799,591 | 1/1989 | Tajima et al. | 378/182 X |
| 4,912,740 | 3/1990 | Liese, Jr. | 206/455 X |
| 4,955,479 | 9/1990 | Beer et al. | 206/455 |

Primary Examiner—Paul T. Sewell
Assistant Examiner—Jacob K. Ackun, Jr.

[57] ABSTRACT

A daylight loading film sheet package has a stack of film sheets enclosed within a wrapper having front and rear panels covering the front and rear faces of the film stack and projecting side extensions on at least three sides of the panels which are folded into contacting relation and adhered together in close proximity to the corresponding sides of the stack to cover such stack sides. One of the wrapper panels has a sheet-dispensing opening therein with one edge adjacent one stack side which is generally coextensive in length with that stack side, such opening extending from the edge into the panel to permit an outermost film sheet to be accessed and withdrawn from the stack therethrough. The dispensing opening is light-tightly covered by a flexible sheet closure attached at one end to the other wrapper panel adjacent the one stack side and overlying the opening with its side margins adhered to the folded side extensions of the panel containing the opening, the sheet closure being adhered to the panel beyond the opening and terminating in a free end to facilitate its stripping removal from the opening.

16 Claims, 9 Drawing Sheets

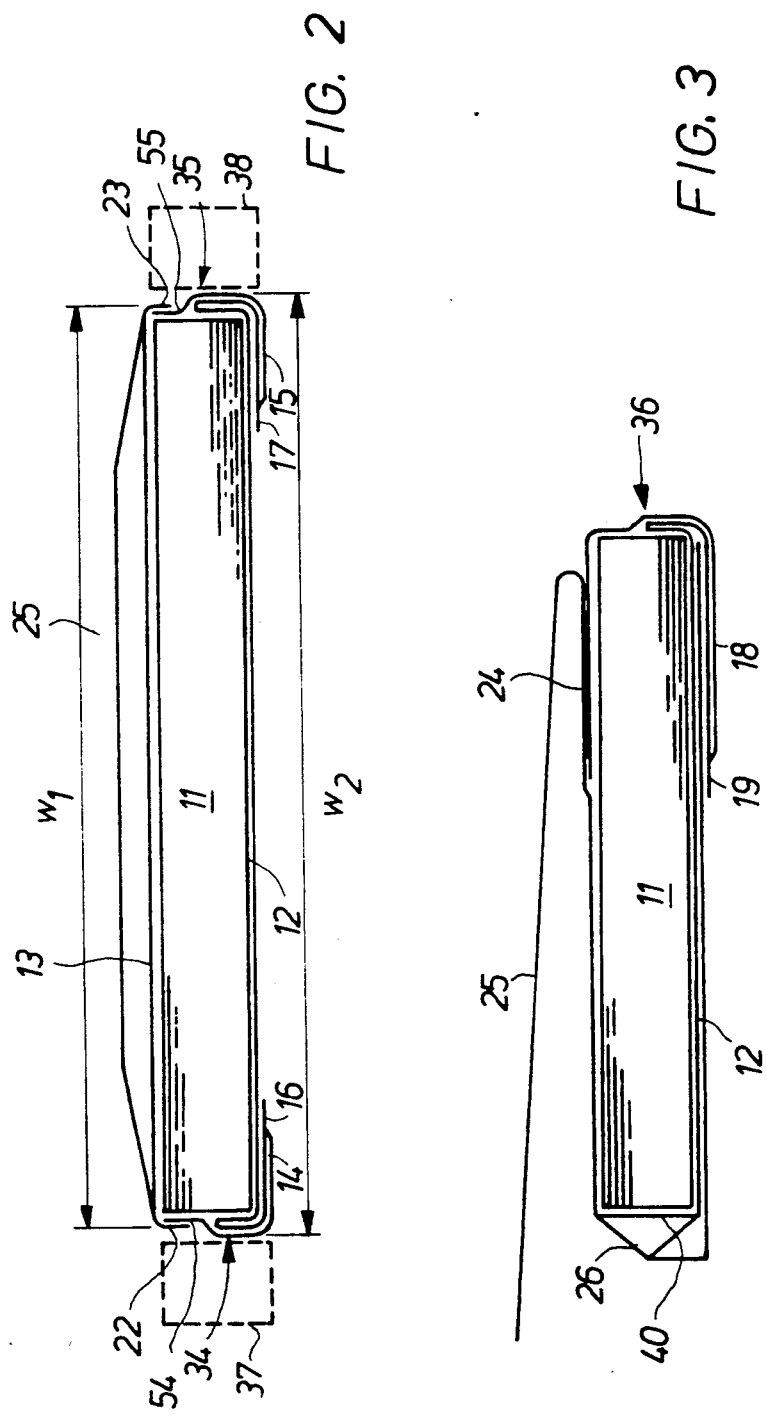

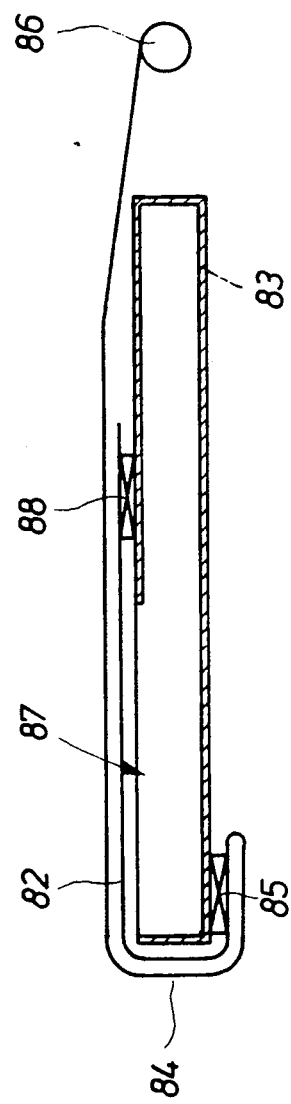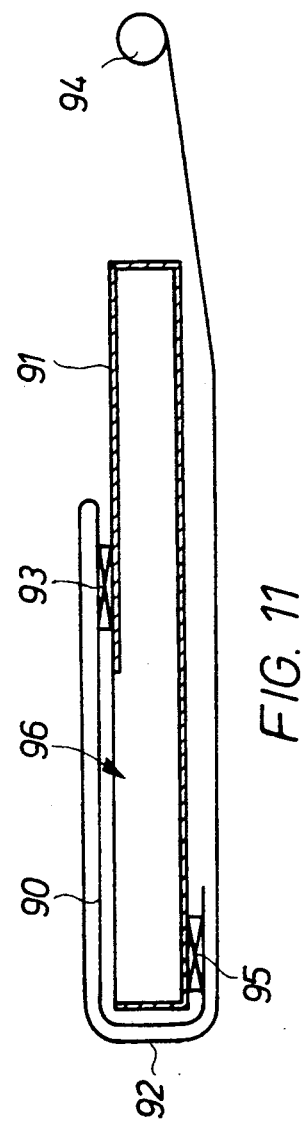

DAYLIGHT-LOADING FILM SHEET PACKAGE

BACKGROUND OF THE INVENTION

1. Field of the Invention

The invention relates to a daylight-loading film sheet package which comprises a stack of film sheets light-tightly wrapped in a light-shielding wrapper, and a method for the production of such wrapper.

Film sheet packages of the described kind are used in medical X-ray departments where a filmcassette loader, or a combined filmcassette unloader/loader is provided for removing in daylight conditions an image-wise exposed film sheet from a film cassette and conveying it to a film processor, and for reloading the emptied cassette with a fresh film of the appropriate format taken from a corresponding magazine with fresh film sheets. The loading of the magazine with fresh film sheets may occur in the darkroom, but a far more convenient method is to load the magazine in daylight conditions by means of an appropriate daylight-loading film sheet package. In this way, the photographic process may be completely carried out without need for a darkroom.

2. Description of the Art

A film sheet package of the described type is disclosed in EU A1 0 313 686 entitled "Film sheet package and method of packaging filmsheets". In this publication there is disclosed a daylight-loading filmsheet package for use with a magazine which comprises a box with a light-tight lid and a winding mechanism at the frontside for pulling the wrapper from a film sheet package contained in the magazine thereby to set the film sheet stack free for removal of the film sheets from the stack, one by one, through the opened lid by a suitable removal mechanism. The film sheet package comprises a stack of film sheets wrapped in a light-tight sleeve that has a closed flap at one end which is arranged for being gripped and wound by the winding mechanism of the magazine, and that has at the opposite end an open flap folded back to light-tightly close the film package.

The mentioned package shows the disadvantage that the complete removal of the wrapping produces a rather voluminous roll of wrapping material which requires extra space in the magazine. Also, the removal of the complete wrapper requires considerable force from the winding mechanism.

A film sheet package of a different type is disclosed in EU A2 0 215 427 entitled "Sheet film package and method and device for loading sheet film". This publication discloses a film sheet package comprising a tray with lips at its top surface to which a flexible cover member is peelably attached.

This construction offers the advantage that only the cover must be removed from the package to provide access to the film sheets. The co-operation of the cover with an arcuately curved passage for pulling the cover away from the trap is critical.

In case the tray is made from a synthetic resin, the tray raises problems with a view to its ecological disposal. If the tray is made from cardboard, its construction to provide lips for the satisfactory attachment of the cover to its top surface may raise problems too.

Another film sheet package is disclosed in JP UM Pub 56(1981)-5141. Also in this case, the attachment of a cover to the opening in the top surface of the package is difficult.

SUMMARY OF THE INVENTION

Objects of the Invention

It is the object of the invention to provide a daylight-loading film package which comprises a light-shielding wrapper which has a removable cover attached to a film-unloading opening of the wrapper, and which wrapper is easy to assemble together with the cover, prior to the formation of the complete package.

Statement of Invention

According to the present invention, a generally rectangular daylight-loading film sheet package which comprises a stack of film sheets light-tightly wrapped in a light-shielding wrapper which has an opening which permits withdrawal of the sheets from the package, and a light-shielding cover or closure sheet which is attached to the wrapper along the peripheral region of the opening and which has a free end for pulling the cover from the opening, the connection of the cover to the wrapper comprising two lateral attachments which are located on opposite side faces of the package.

According to a suitable embodiment of the invention, the two attachments are in the form of peelable seals, sealing the cover to the wrapper.

According to another embodiment of the invention, the two attachments are in the form of permanent seals, and the setting free of the film removal opening is based on the tearing of the cover along well-determined lines. These lines may be determined as known in the art by weakened zones of the cover, by included tearstrips, etc. It is also possible to make use of unidirectionally tearable foil.

According to still another embodiment, the attachments may be based on the clamping of margins of the cover between overlapping wall sections of a rigid wrapper.

The opening in the light-shielding wrapper may be situated in the top surface of the film package and cover the complete surface of a film sheet or only a portion thereof. However the opening of the wrapper may also be situated in, or extend to other surfaces of the film package.

The opening may have a rectangular, window-like shape, but other opening shapes are encompassed as well by the invention.

The wrapper of the film package is in a suitable embodiment of the invention formed by a flexible bag which is properly folded about the film stack to obtain a generally rectangular shape. However, the wrapper may also be formed from rigid material, made for instance from paper board divided into panels by fold lines etc.

The free end of the light-shielding cover may have lateral edges which taper together in the direction of the front edge, up from the two lateral attachments on the opposite side faces. Further, the free end of the cover may be folded back onto the package.

The present invention includes also a method for the production of a wrapper for the new film sheet package.

According to the invention, a method of producing a wrapper for the manufacturing of a daylight-loading film sheet package, comprises the steps of providing a light-tight wrapping foil with an opening suitable for film withdrawal, attaching to said opening a light-shielding cover that has a freely extending end, and using the wrapper thus prepared for the wrapping of a stack of film sheets.

In one form of execution of the inventive method, the wrapper is a foil which is folded in two, sealed along opposite edges that join the fold line thereby to produce a bag, and the stack of sheets is then slid into the bag and the remaining opening is sealed.

In another form of the method, the wrapper may be a one-piece folder formed from a scored and slotted rigid sheet, and the wrapper is folded around the stack of film sheets and panels of the wrapper are fixedly attached to each other to produce a light-tight package.

BRIEF DESCRIPTION OF THE DRAWINGS

The invention will be described hereinafter by way of example, with reference to the accompanying drawings wherein:

FIG. 2 is a sectional view on line 2—2 of FIG. 1, FIG. 3 is a sectional view on line 3—3 of FIG. 1, FIG. 10 is a diagrammatic illustration of another embodiment of the inventive package, and FIG. 11 is a diagrammatic illustration of still another embodiment of such package.

DETAILED DESCRIPTION OF THE INVENTION

Figure 1:
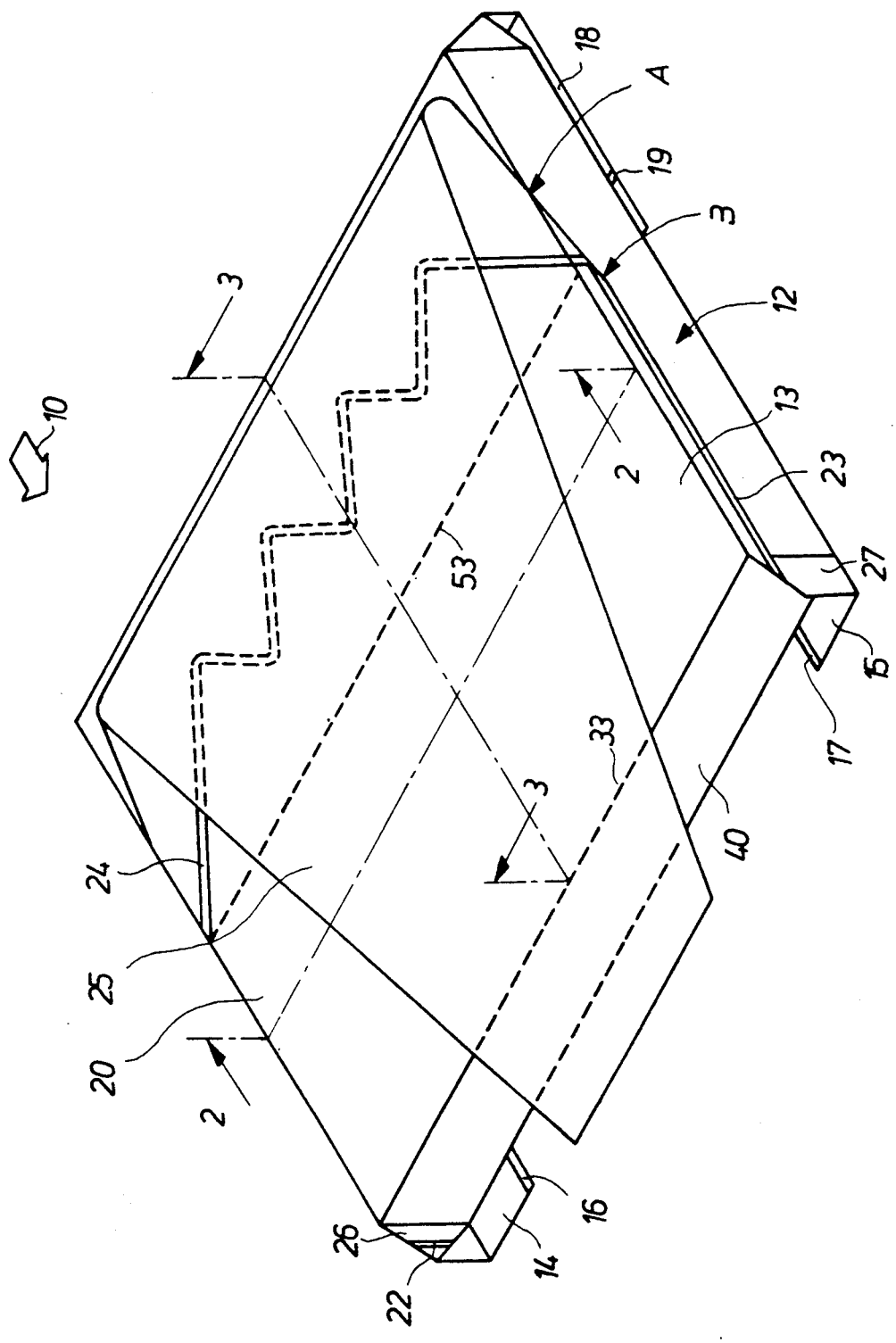
FIG. 1 is an isometric view of one embodiment of a film package according to the present invention.

FIG. 1 is an isometric view of one embodiment of a flexible form of a daylight-loading film sheet package according to the present invention. The package, indicated generally by the number 10, comprises a stack of equally sized X-ray film sheets 11, not visible in this figure, that is wrapped in a wrapper in the form of a light-shielding flexible bag 12 provided with a light-shielding cover 13.

The bag and the cover may be made from the same or from a different type of material. Referring to the bag, the wrapping foil may be a laminate of a paper, an aluminium and a black polyethylene layer whereas the cover may be a laminate of an aluminium foil and a black polyethylene layer. The outer, paper layer of the bag may be provided with a layer suited to enable the peelable sealing of the cover to the bag. This sealing, as well as the other sealings which will be described hereinafter in the description, are heat-sealings made by the melting and the adhesion of the polyethylene layer(s) under the influence of heat and pressure brought about by heated sealing bars, as known in the art.

The package has two opposite ends 14 and 15 with seals lines 16 and 17 (which in fact are stripes with a width of approximately 3 to 10 mm), and folded on the back of the package. The package has further a third end 18 with a seal 19 and folded on the back of the package, onto the ends 14 and 15.

The package has a window-like opening 20 in its top face, and the opening is shielded by a light-shielding cover 13 which is attached to the wrapper through four seals, namely a transverse seal 21 on the rearside of the package (not visible on this figure), lateral seals 22 and 23 on the opposite side faces of the package, and a seal 24 on the top face of the package. The pattern of the seal 24 has a sawtooth-like configuration so that upon the application of a pulling force upon the cover to detach it from the package, the resistance force is gradual. The rear end edge of the stack of sheets in the package is indicated by the numeral 33.

The package is illustrated in detail in FIGS. 2 and 3 which are vertical cross-sections on lines 2—2 and 3—3 of FIG. 1.

FIG. 2 illustrates the bag 12 with the two opposite ends 14 and 15 folded on the back of the package. The cover 13 is folded with its lateral ends over the corresponding side faces 54, 55 of the package, and sealed thereto on seal lines 22 and 23.

FIG. 3 illustrates the bag 12 with the third end 18 folded on the back of the package. The triangular portions 26 and 27, see also FIG. 1, result from the application of the corresponding wall portion of the bag against the rear surface 40 of the package.

Figure 4:
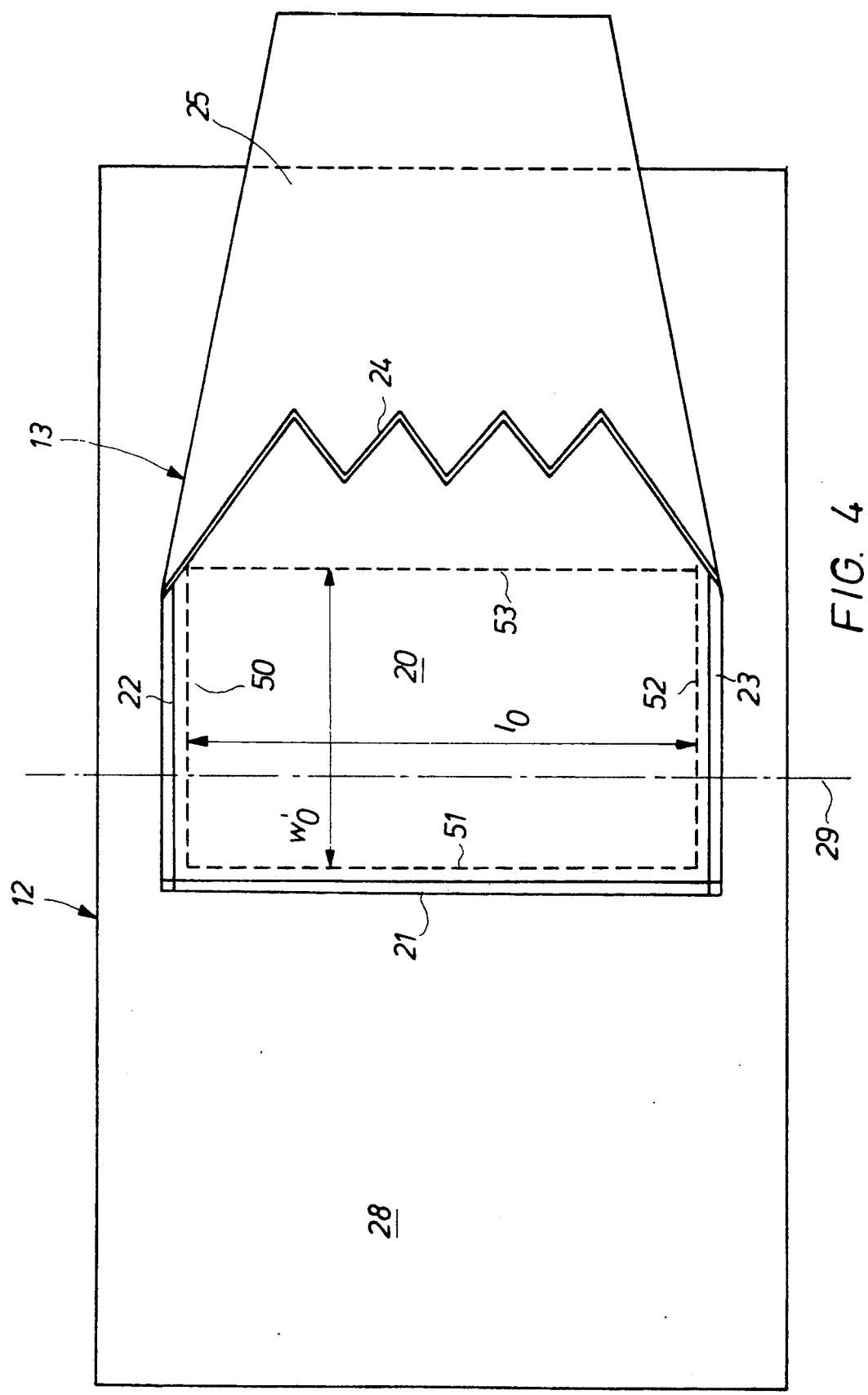
FIG. 4 is a view of the wrapper of the package at the first stage of its formation.

The manufacturing of the light-shielding bag is described with reference to FIG. 4. The bag 12 is made from a rectangular foil 28 of flexible wrapping material which in the present embodiment has a rectangular opening 20, illustrated in broken lines (50, 51, 52 and 53). The light-shielding cover 13 is sealed to the peripheral region of this opening through four seals, namely the two lateral seals 22 and 23, the rear transverse seal 21, and the front transverse seal 24 in sawtooth-like form. The end 25 of the cover 13 lies freely on the bag foil 28.

Figure 5:
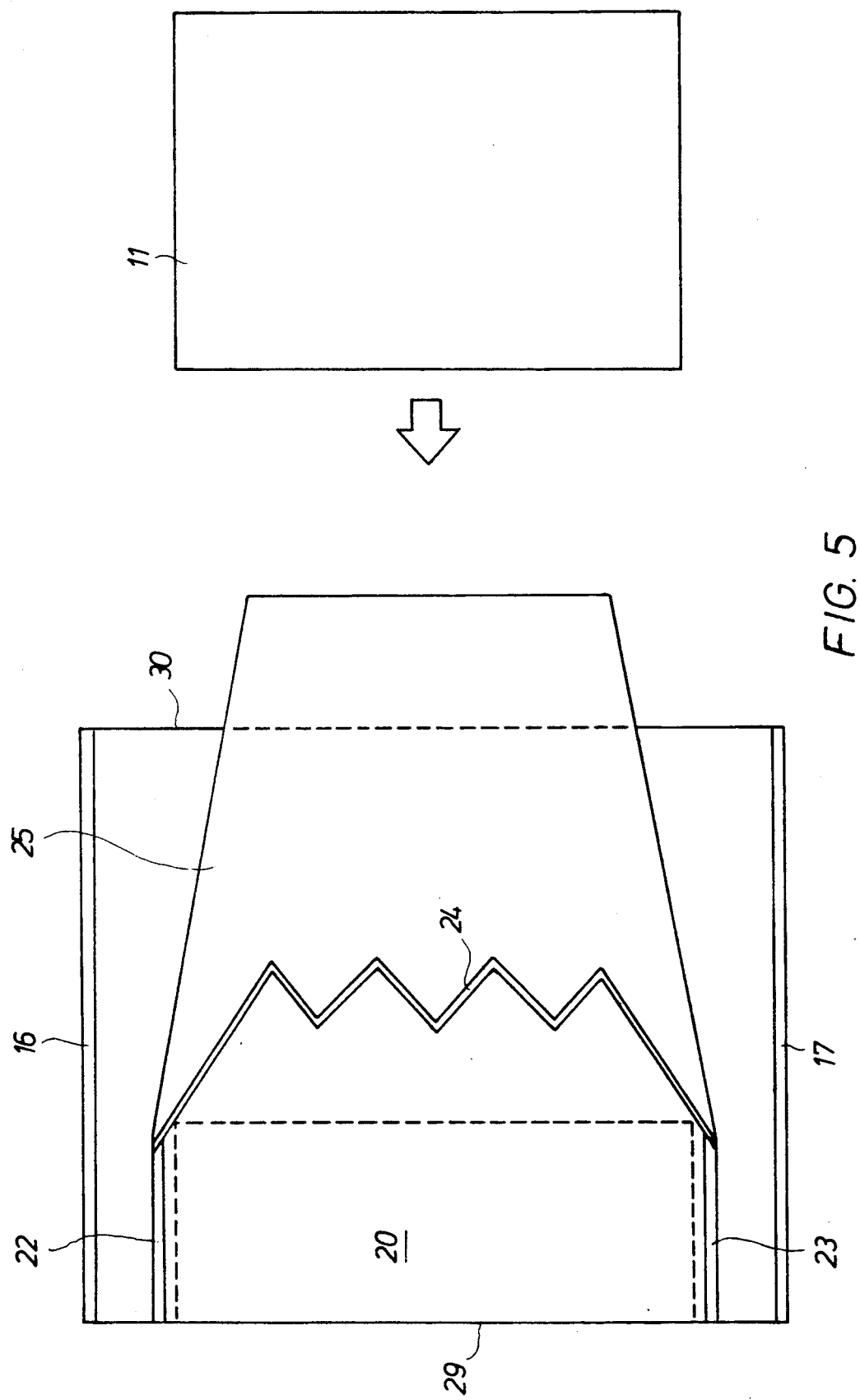
FIG. 5 is a view of the wrapper of FIG. 5 at the second stage of its formation.

The foil which has been prepared as described hereinbefore, is then doubled over upon itself along the line 29, which is located halfway the length of the foil 28. The left hand portion of the foil 28 is located under the right hand portion and both portions are fixedly attached to each other by seals 16 and 17, see FIG. 5. In this way, a flat bag has been produced which is open at its right hand edge 30. A stack of sheets 11 is then slid into the bag which is held open by any means known in the art.

Figure 6:
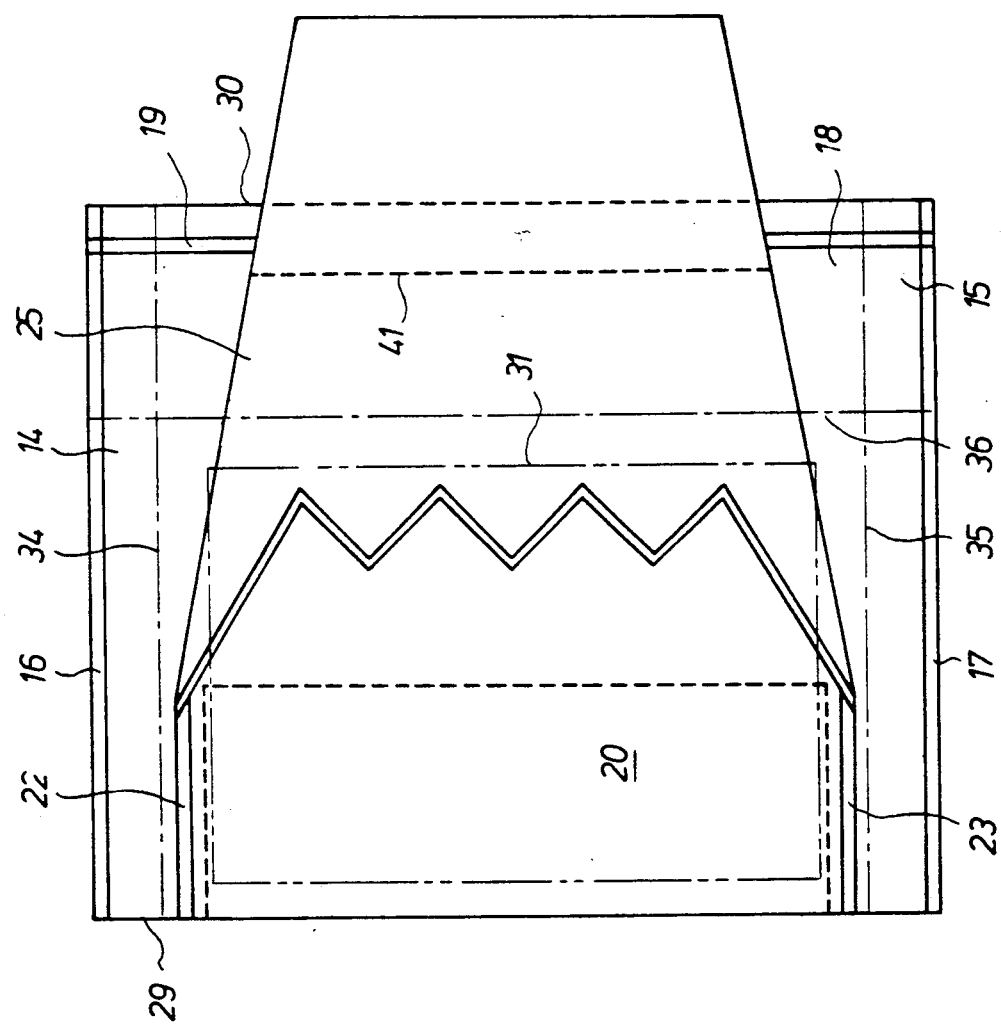
FIG. 6 illustrates the finished package.

The stack of sheets 11 has a position in the bag as illustrated by the rectangle 31 in broken lines in FIG. 6. The open end 30 of the bag is closed through a transverse seal 19. The sealing of the open end of the bag occurs after the bag has been applied tightly about the stack of sheets. This tight application may occur by any means known in the art.

The tight application of the bag causes the ends of the bag extending on three sides beyond the stack of sheets 31 to become reasonably flattened whereby in fact three flaplike ends are produced which may be readily folded along fold lines illustrated diagrammatically by the dash-and-dot lines 34 and 35 for the ends 14 and 15, and along the line 36 for the end 18. The position of these fold lines is indicated in FIGS. 2 and 3 by the correspondingly numbered arrows. This way of folding has an advantage for the lateral seals 22 and 23, since it may be seen in FIG. 2 that the lower half of the side faces 54 and 55 of the package comprises three plies of bag foil, whereas the upper half comprises only one ply. In consequence, the sealing of the cover 13 by means of seals 22 and 23 produces an overall width $w_1$ which is smaller than the width $w_2$ of the lower half of the package. This means that the package may be firmly clamped within opposed lateral wall means of a magazine, indicated diagrammatically by the blocks 37 and 38 in broken lines, while yet some clearance is left for the backfolding of the cover 13 at the seals 22 and 23 as the cover is withdrawn from the package.

To open the package one proceeds as follows. A suitable film magazine is removed from a cassette unloader/loader and a film package as described hereinbefore is placed in the open space of the magazine. The package as such may cover the magazine completely, but it may occupy also only a portion of the available space in the magazine, since common magazines are provided with displaceable bars whereby corresponding locations for different film formats are determined in the magazine.

The free end 25 of the cover 13 is folded completely backwardly and is then arranged for being pulled from the package. This may occur by attachment of the free end 25 of the cover to a winding spindle in the magazine, which is put into rotation after the magazine has been closed, as known in the art.

The withdrawal of the cover causes first the outermost ends of the seal 24, see FIG. 1, to rupture, and then the sawtooth configurations of the seal are progressively broken. When the pulling line reaches the innermost tops of the sawtooth, the width of the free end of the cover corresponds practically with the width of the package, see the position indicated by A on FIG. 1. From that position, continuing the withdrawal of the cover causes the rupturing of the lateral seals 22 and 23. At the position designated B, the uncovering of the opening 20 is started and this continues up to the rear face 40 of the package.

The tapering of the lateral edges of the free end of the cover causes the smooth and reliable backfolding of the lateral margins of the cover as the cover is pulled backwardly beyond the position of A.

When the cover has been removed as far as the rear face 40, the opening 20 is freely accessible and the filmsheets can be removed in succession from the film package by suction means or rotatable or displaceable fingers, which first cause the exposed end of the upper filmsheet to be pulled upwardly, and which then advance such end towards film driving rollers which fully withdraw the film from the package, and convey the film to a film cassette that must be reloaded with a fresh film.

The free end 25 of the cover may be folded on itself to reduce the length of this end in view of the further wrapping of the package. This folding can occur on a line 41 as illustrated by way of example in FIG. 6.

The film package according to the invention may be wrapped in another wrapping bag, which may be evacuated and airtight sealed. Such other bag, and in particular its seals, may be better airtight than the seals of the described package (such as the seal 24) so that an improved conservation of the package may be obtained, until the first use of the package.

Furthermore, a package according to the invention may be wrapped together with a number of equal packages in a wrap-around paper board container. For instance, a container may comprise 5 packages, each comprising 100 radiographic film sheets measuring 18×24 cm.

The film package according to the invention may also be provided with a cardboard sheet on its bottom to offer protection for the stack of sheets during the manipulation of the package. The cardboard sheet may have a U-shaped form for better protection of the film sheets, and for increased rigidity of the stack of sheets.

Figure 7:
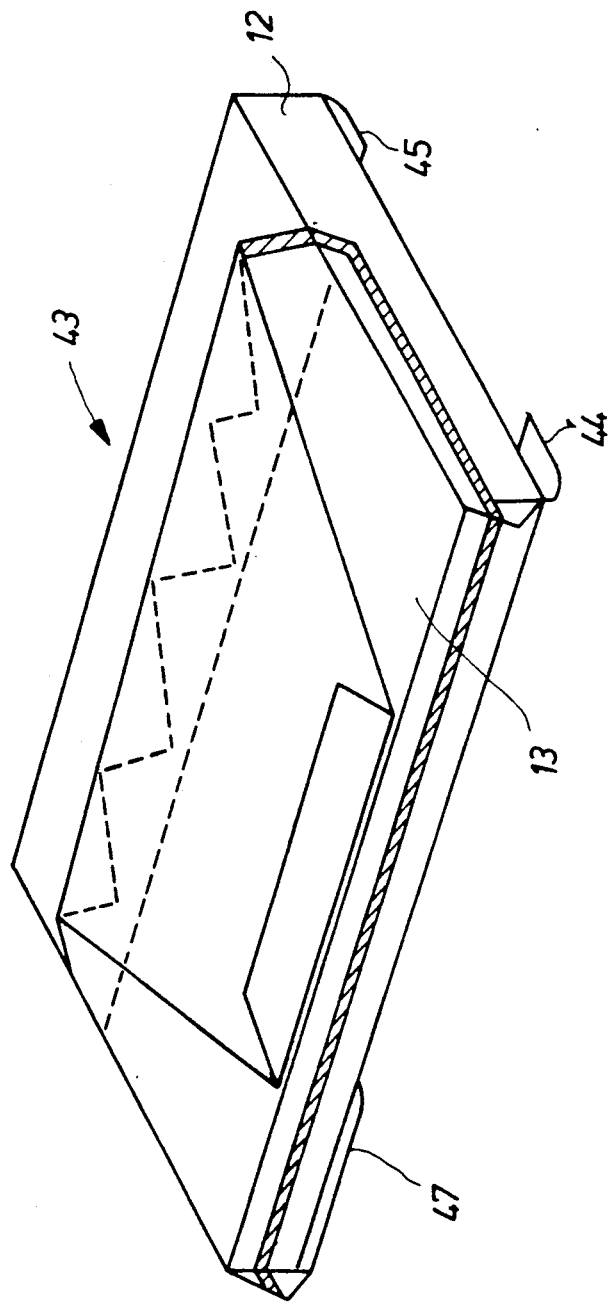
FIG. 7 illustrates a different form of a film package.

In the example illustrated hereinbefore, the film sheet stack was inserted in the light-shielding bag in the longitudinal direction of the bag. It will be understood that the film sheet stack may also be inserted in the bag according to a transverse direction. The general configuration of such package is illustrated in FIG. 7 which shows that the package 43 has two opposite ends 44 and 45 folded back on the back of the package, and a third end 47, through which the bag was filled, located on the back of the package, over the ends 44 and 45.

Also, the ends of the wrapping bag 12 need not necessarily be folded beneath of the package. The end 18 of the package according to FIG. 1 may also be folded over the top face of the package, and overlie the folded cover 13. This does not interfere with easy stripping of the cover from the package, but the end should not extend beyond the edge 53 of the opening 20.

The shape of the opening 20 is a true rectangle in the illustrated embodiment. It is clear that this form is not essential for the invention, and thus the opening may have for instance a trapeziumlike form, the edge 51 being the basis of the trapezium and the edge 53 being the opposed narrower counterpart. The edges 50 and 52 run in that case slightly obliquely from the ends of edge 53, so that the opening widens in the direction towards the rear face 40 of the package whereby the risk for occasional jamming of the sheets in the case of an incorrect transverse alignment of the stack in the bag, is reduced or avoided.

The edge 51 of the opening 20 was located in the present example in line with the bottom face of the package. It is clear that said edge 51 may become situated higher, and may coincide with the upper end edge 33 of the film stack, see FIG. 1, or even be situated in the plane of the top face of the package.

An other embodiment of a film sheet package according to the invention is illustrated in the next figures.

Figure 8:
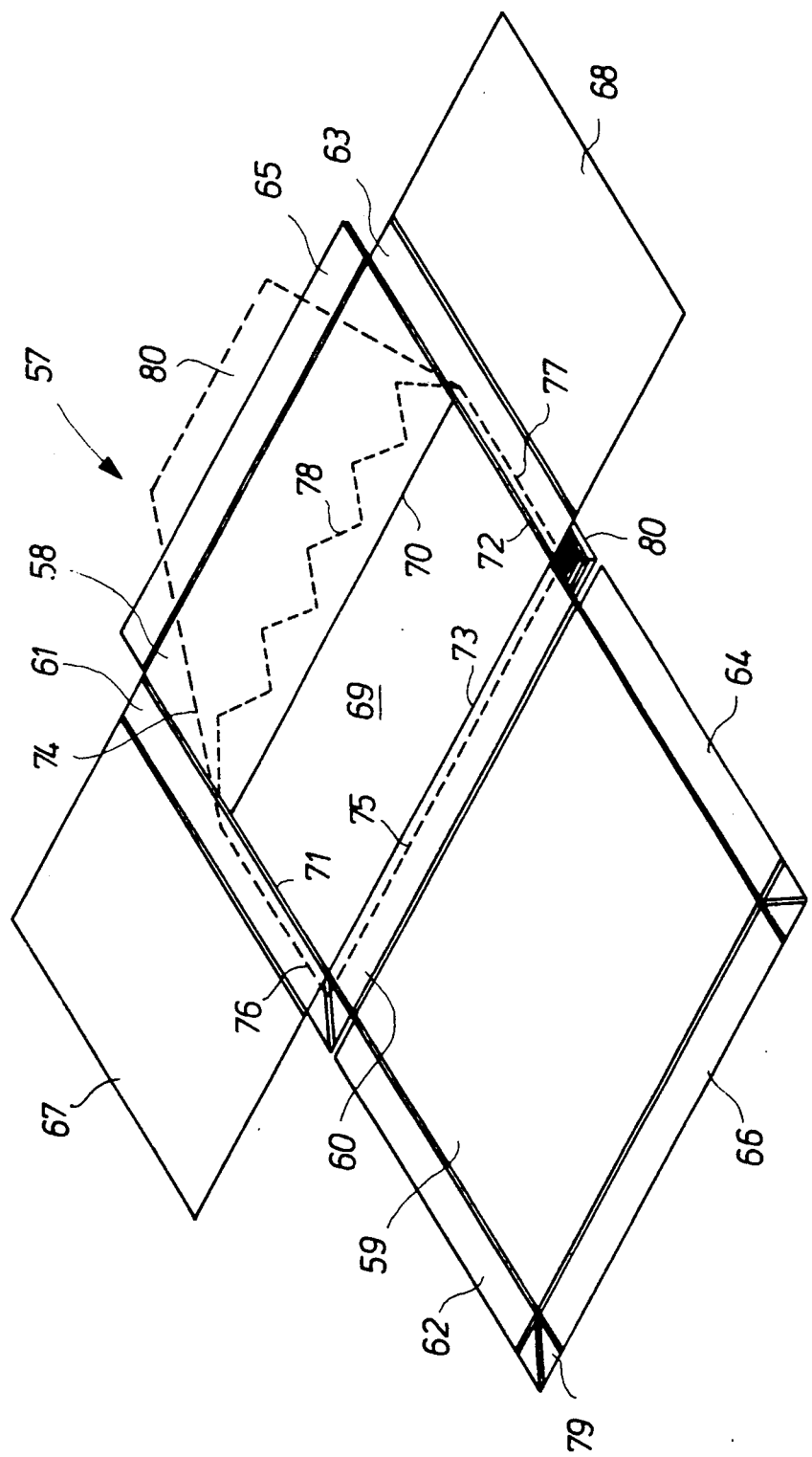
FIG. 8 is an isometric view illustrating one embodiment of a wrap-around wrapper according to the invention.
Figure 9:
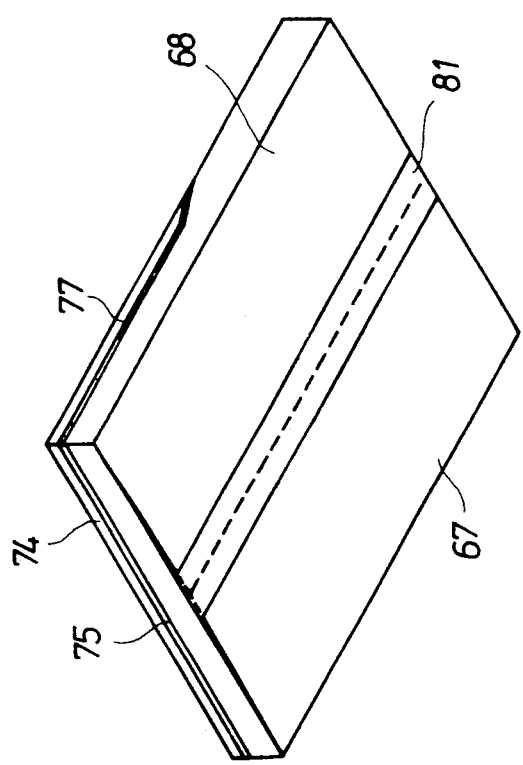
FIG. 9 is an isometric view of the finished package of FIG. 8.

Referring to FIGS. 8 and 9, there is illustrated an embodiment of a rigid film package which is based on the wrap-around application of the wrapper around the stack of film sheets.

The wrapper 57 is a board that has appropriately been cut and scored. The board comprises a top panel 58, a bottom panel 59, one single side panel 60, and three side panel pairs 61-62, 63-64 and 65-66 that will overlap in the end package, and finally two half-size panels 67 and 68 that will overlap the bottom panel 59.

The twin lines represent the scoring of the board.

The top panel 58 has an opening 69, the front edge of which is indicated by the numeral 70, the side edges 71 and 72 coinciding with the side edges of the panel 58, and the rear edge 73 of which coincides with the top edge of the side panel 60.

The opening is shielded by a light-shielding cover foil 74 which has been illustrated in the figure in broken lines. The foil is sealed to three side panels 60, 61 and 63 of the carton along lines 75, 76 and 77 (in fact narrow bands) in a way similar as described hereinbefore with reference to FIG. 1. The fourth seal is formed by the sawtooth-like bond 78 on the top panel of the package.

In the drawing, the flap of the folding carton between the side panels 60, 63 and 64 has been left out, in order to illustrate the stack 80 of the film sheets.

In the manufacturing of the package, the folding carton with the cover attached thereto is laid over the stack of film sheets which is positioned on a suitable packaging platform, the assembly is immobilized to exclude relative displacement of the parts, and then reversed over 180 degrees, whereupon the side and the bottom panels are folded to wrap the folding carton around the sheet stack. The pair of corresponding side flaps are stuck to each other, and the flaps 67 and 68 are attached to each other by means of a tape 81 as illustrated in FIG. 9 which is a view of the package from the bottomside. This figure also illustrates the side seals 76 and 77 of the cover 74 to the side panels of the package.

The package thus manufactured does not constitute an airtight wrapper for the film sheets, and therefore it is desirable to wrap the package in a flexible bag which is evacuated prior to its sealing. Such bag must have good airtight properties, and preferably such bag also contributes to the light-tightness of the package.

The rigid form of a package according to the invention is not limited to the embodiment described hereinbefore.

For instance, the opening 69 may be larger and occupy occasionally the full area of the top panel of the package. In such case, the seal 78 must be formed on the side panel 65 of the folding carton, and the free end of the cover be folded back on the upper portion of said side panel and also on the top panel of the package.

The light shielding of the corner portions of the package is achieved in the embodiment shown in FIG. 8 by the corner sections such as 79 which are arranged to be folded against a corresponding side panel thereby to produce a light-tight connection between the side panels. It is clear that other corner constructions known in the art of box-making may be used as well.

A rigid package may also be obtained by the use of a full telescope box in which the stack of film sheets is packaged. The top face of the lid of the box is provided with an opening for the removal of the sheets, and the light-shielding cover is attached to the lid by means of an easily rupturable front seal, and a rear seal as described hereinbefore, whereas the lateral margins of the cover may be engaged between the corresponding lateral side panel pairs of the box, providing in this way a light-tight closure of the opening.

The folding back of the light-shielding cover of the film package may occur in other ways than illustrated in the figures hereinbefore, and alternative forms are shown diagrammatically in FIGS. 10 and 11.

Referring to FIG. 10, a light-shielding cover 82 for a box 83 has an elongate free end 84 which is folded back from its bottom seal 85, and which runs over the top of the package up to a winding spindle 86 for withdrawal of the cover in order to uncover the opening 87 of the box. The top transverse seal 88 of the cover, as well as the bottom seal have a non-linear pattern that produces a gradual resistance fore. Continued rotation of the spindle causes finally the complete removal of the cover from the package.

Referring to FIG. 11, a light-shielding cover 90 for a box 91 has an elongate free end 92 which is folded back from its top seal 93, and which runs under the bottom of the package up to a winding spindle 94 for withdrawal of the cover. Both seals 93 and 95 of the cover have a non-linear configuration, so that also in this case rotation of the spindle in order to unshield the opening 96, causes the complete withdrawal of the cover from the package.

We claim:

1. A generally rectangular daylight-loading film sheet package which comprises a stack of generally rectangular film sheets which has front and rear faces and four sides, a wrapper of opaque wrapping material for said stack, said wrapper having front and rear flat panels on the front and rear faces of the stack and side extensions projecting from the sides of such flat panels laterally beyond at least three of the sides of said stack, the corresponding projecting side extensions on all such sides of the two flat panels being folded relative to the respective panels into mutually contacting relation and adhesively sealed together in close proximity to the stack sides to light-tightly enclose said stack sides, one of said flat panels being formed with a sheet-dispensing opening therein having an edge adjacent one side of the film sheet stack and generally corresponding in extent with the length of that side, said opening extending from said edge into that flat panel partially over its perpendicular dimension to permit an outermost sheet in said stack to be accessed and removed from the stack through such opening, and a removable opaque flexible sheet closure for light-tightly closing said sheet-dispensing opening, said sheet closure being attached at one end to the other flat wrapper panel adjacent said edge of the dispensing opening and passing over the dispensing opening in said one panel the section of the closure adjacent its attached end having side margins adhered to the adjacent side extensions of said one wrapper panel and beyond such section adhered to the panel outside the free edges of said dispensing opening, said closure sheet having a length exceeding the perpendicular dimension of the opening to provide a free end opposite to its attached end for stripping removal thereof from the wrapper to uncover said dispensing opening.

2. The film sheet package of claim 1 wherein said wrapper is formed from a single sheet of said opaque material, said sheet being doubled over upon itself to give two flat panels having side extensions along three sides thereof and joined along their fourth side by a fold, and said dispensing opening is a cut-out beginning at one edge adjacent the fold and extending into the adjacent region of one flat panel.

3. The film sheet package of claim 1 wherein said wrapper is formed from a single sheet of said opaque material, said sheet being doubled over upon itself to give two flat panels having side extensions along three sides thereof and joined along their fourth side by a fold, and said dispensing opening is a cut-out beginning at one edge along a side of one flat panel carrying a projecting side extension and commensurate in extent with such panel side and extending into the adjacent region of said one flat panel.

4. The film sheet package of claim 1 wherein the sheet closure is adhered to the one flat wrapper panel or adjacent side extensions by a peelable seal.

5. The film sheet package of claim 1 wherein said sheet closure is tearable for stripping removal thereof.

6. The film sheet package of claim 1 wherein said wrapper material is a flexible foil sheet and the corresponding side extensions are pinched together into adhered sandwich relation proximate to the stack sides.

7. The film sheet package of claim 5 wherein the adhered sandwiches of the side extensions are foldable over the adjacent side margins of one of the wrapper panels.

8. The film sheet package of claim 1 wherein said sheet-dispensing opening includes a section adjacent said edge having a width generally coextensive with said edge and said sheet closure includes a section adjacent its attached end that overlies the opening section, such overlying sheet section having a transverse dimension exceeding the length of said opening edge and being adhered along its side margins to the side extensions carried by the one wrapper panel, the sheet closure beyond the overlying section being adhered to the one wrapper panel outside said dispensing opening to complete the light-tight closure of said dispensing opening.

9. The film sheet package of claim 7 wherein the adherence of the sheet closure beyond the overlying section is by means of a peelable seal to the one wrapper panel and said peelable seal is of non-linear configuration whereby the peeling rupture thereof occurs progressively.

10. The film sheet package of claim 9 wherein said one end of said sheet closure is attached to said other wrapper panel by means of a peelable seal.

11. The film sheet package of claim 10 wherein said peelable seal attaching said one end of the sheet closure is of non-linear configuration for progressive peeling rupture thereof.

12. The film sheet package of claim 1 wherein the lateral edges of the free end portion of said closure sheet taper convergingly toward the free end thereof.

13. The film sheet package of claim 1 wherein the free end of said sheet closure is folded upon itself over said one wrapper panel.

14. The film sheet package of claim 1 wherein film sheets are radiographic film sheets.

15. A package according to claim 1, which is additionally wrapped in an airtight wrapper.

16. A package according to claim 1, wherein the film sheets are radiographic film sheets.

* * * * *

UNITED STATES PATENT AND TRADEMARK OFFICE
CERTIFICATE OF CORRECTION

PATENT NO. : 5,139,148

DATED : August 18, 1992

INVENTOR(S) : DIRK PEETERS ET AL

It is certified that error appears in the above-identified patent and that said Letters Patent is hereby corrected as shown below:

Column 8, line 60, change "5" to --6--.

Column 9, line 9, change "7" to --8--.

Signed and Sealed this

Twenty-fourth Day of August, 1993

Attest:

BRUCE LEHMAN

Attesting Officer          Commissioner of Patents and Trademarks